United States Patent
Vissers et al.

(10) Patent No.: US 12,458,051 B2
(45) Date of Patent: Nov. 4, 2025

(54) NUTRITIONAL COMPOSITION COMPRISING MILK AND EGG PHOSPHOLIPIDS

(71) Applicant: AAK AB (PUBL), Malmö (SE)

(72) Inventors: Martinus M. M. Vissers, AA Koog Aan de Zaa (NL); Lotte Smolders, AA Koog Aan de Za (NL)

(73) Assignee: AAK AB (PUBL), Malmö (SE)

( * ) Notice: Subject to any disclaimer, the term of this patent is extended or adjusted under 35 U.S.C. 154(b) by 383 days.

(21) Appl. No.: 17/755,287

(22) PCT Filed: Oct. 28, 2020

(86) PCT No.: PCT/SE2020/051045
§ 371 (c)(1),
(2) Date: Apr. 26, 2022

(87) PCT Pub. No.: WO2021/086255
PCT Pub. Date: May 6, 2021

(65) Prior Publication Data
US 2022/0386671 A1 Dec. 8, 2022

(30) Foreign Application Priority Data
Oct. 29, 2019 (SE) .................................... 1951235-9

(51) Int. Cl.
*A23L 33/115* (2016.01)
*A23L 2/39* (2006.01)
(Continued)

(52) U.S. Cl.
CPC .............. *A23L 33/115* (2016.08); *A23L 2/39* (2013.01); *A23L 2/66* (2013.01); *A23L 33/105* (2016.08);
(Continued)

(58) Field of Classification Search
CPC ...... A23L 33/115; A23L 33/19; A23L 33/105; A23L 33/16; A23L 33/40; A23L 2/39; A23L 2/66; A23P 10/47; A23P 10/40
(Continued)

(56) References Cited

U.S. PATENT DOCUMENTS

2016/0015068 A1 1/2016 Ao et al.
2019/0254994 A1 8/2019 Schneider et al.

FOREIGN PATENT DOCUMENTS

| CN | 110326790 A | 10/2019 | |
|---|---|---|---|
| EP | 1800675 A1 * | 6/2007 | ............ A23L 33/115 |
| WO | WO 2009/095435 A1 | 8/2009 | |

OTHER PUBLICATIONS

Contarini et al., "Phospholipids in Milk Fat: Composition, Biological and Technological Significance, and Analytical Strategies," Int. J. Mol. Sci., 14:2808-2831 (2014).
(Continued)

*Primary Examiner* — Brent T O'Hern
(74) *Attorney, Agent, or Firm* — Finnegan, Henderson, Farabow, Garrett & Dunner, LLP

(57) ABSTRACT

The present invention provides a nutritional composition especially well suited as an infant nutritional composition especially well suited as an infant nutritional composition, but also as a nutritional support product for pregnant women and as senior nutritional supplement, where phosphatidylcholine and sphingomyelin, and thus choline, also are highly relevant. The present invention provides a nutritional composition which contains choline of high bio-availability.

16 Claims, 3 Drawing Sheets

Figure 1:
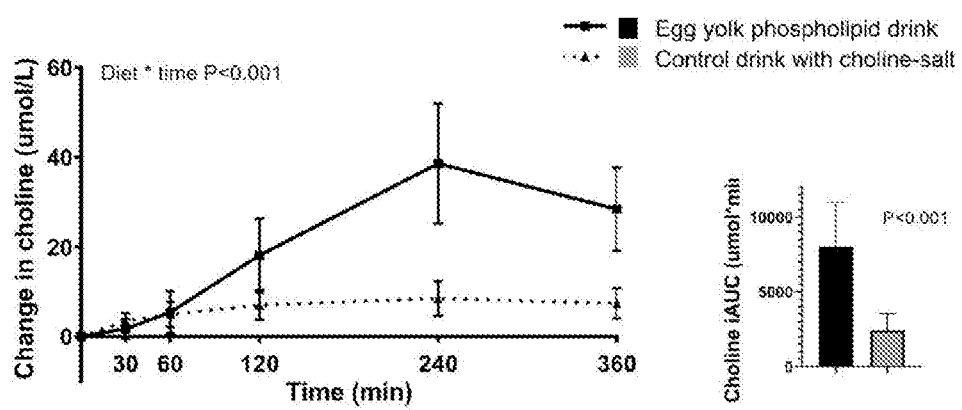

(51) Int. Cl.
      *A23L 2/66*       (2006.01)
      *A23L 33/00*      (2016.01)
      *A23L 33/105*     (2016.01)
      *A23L 33/16*      (2016.01)
      *A23L 33/19*      (2016.01)
      *A23P 10/40*      (2016.01)
      *A23P 10/47*      (2016.01)

(52) U.S. Cl.
      CPC ............... *A23L 33/16* (2016.08); *A23L 33/19* (2016.08); *A23L 33/40* (2016.08); *A23P 10/40* (2016.08); *A23P 10/47* (2016.08)

(58) Field of Classification Search
      USPC ........................................................ 426/601
      See application file for complete search history.

(56) References Cited

OTHER PUBLICATIONS

Zhao et al., "Measurement of phospholipids by hydrophilic interaction liquid chromatography coupled to tandem mass spectrometry: The determination of choline containing compounds in foods," J. Chromatogr., 1218:5470-5479 (2011).
International Search Report for International Application No. PCT/SE2020/051045, dated Nov. 27, 2020.
Written Opinion of the International Search Authority for International Application No. PCT/SE2020/051045, dated Nov. 27, 2020.

* cited by examiner

A.

B.

NUTRITIONAL COMPOSITION COMPRISING MILK AND EGG PHOSPHOLIPIDS

This application is a national stage filing under 35 U.S.C. § 371 of International Application No. PCT/SE2020/051045, filed on Oct. 28, 2020, which claims the benefit of the filing date of Swedish Patent Application No. 1951235-9, filed on Oct. 29, 2019, each of which is incorporated herein by reference in its entirety.

TECHNICAL FIELD

The present invention relates to the field of nutritional composition especially infant formulas, nutritional support for pregnant women and senior nutrition.

BACKGROUND

At different stages in the life of a human the different nutritional requirements can be difficult to achieve through the regular diet for many different reasons.

When it comes to feeding infants nothing and no product is as good as the human breast milk. However, in some cases, breastfeeding the infant is not possible due to medical reasons or because the mother chooses not to breastfeed. In these situations, nutritional compositions for infants have been developed.

Pregnant women also have a different nutritional requirement than non-pregnant women and obtaining the right amount of the important nutrients for the developing fetus can be difficult to achieve through the regular diet of the women. In this case a nutritional composition for pregnant women could be needed.

With a growing elderly population senior nutrition has also become increasingly important. Because the appetite of elderly people is usually decreased, it can be difficult to have an adequate food intake to obtain the right amount of nutrients. For this, senior nutritional compositions have been developed.

It is known in the art that nutritional composition can be made specifically for infants, pregnant women and/or elderly people.

WO02015078506 discloses a nutritional composition for infants and small children wherein the composition comprises various phospholipids in an amount of at least 300 mg/L. The focus of this invention is on the use of said nutritional composition to reduce the risk of the infant developing metabolic syndrome, increased weight gain, increased fat deposition, overweight, obesity, insulin resistance, glucose intolerance or diabetes mellitus later in said infant's life.

WO2017167417 discloses a composition for young children and infants comprising choline and has shown to improve cognitive and learning potential. The composition can be taken along breast milk and separately as infant formula.

Neither of the documents describes the differences in bio-availability of choline and the importance of this and hence does not provide the solution of combining the egg and milk phospholipids in one nutritional composition to overcome this technical problem.

There is thus a need for nutritional compositions meeting the requirements for these different populations. One of the key factors in nutritional compositions is to solve the technical problem of providing a product where the bio-availability of the different components is high, so that they can be readily absorbed by the recipient. The present invention addresses and solves such needs and interests.

SUMMARY OF THE INVENTION

One of the key compounds in the human breast milk is the natural form of choline, which is essential for infants' cell and brain development, and is supplied through the human breast milk predominantly via phospholipids.

To reach the same levels of choline in infant nutritional compositions as in human breast milk, choline salts are usually added to the nutritional composition. Choline salts however, do not have a good bioavailability, which is why an alternative source of choline is needed in the field. The present invention solves this problem by administering milk and egg phospholipids together to provide a nutritional composition which fulfills the nutritional requirements of infant nutrition combined with high bioavailability of the choline.

The milk and egg phospholipids present in the nutritional composition of the present invention provide a surprisingly high level of phosphatidylcholine and sphingomyelin with levels well within the requirements made to infant nutrition supplements, while at the same time keeping the high bio-availability needed. The present invention provides a nutritional composition especially well suited as an infant nutritional composition, but also as a nutritional support product for pregnant women and as senior nutritional supplement, where phosphatidylcholine and sphingomyelin, and thus choline, also are highly relevant.

In one aspect the present invention relates to a nutritional composition comprising milk phospholipids and egg phospholipids and optionally vegetable phospholipids, and wherein the nutritional composition contains at least 6 mg choline/100 kJ. In this general aspect and other described embodiments of the invention mg choline/100 kJ means the amount of choline measured as mg is bound or unbound choline present in the compositions, i.e. the amount of choline measured on the choline moiety/molecule.

Further embodiments include compositions, wherein the source of choline is phospholipid bound choline.

Further embodiments are wherein said milk phospholipids include phosphatidyl choline, lysophosphatidyl choline and sphingomyelin. The milk phospholipids are in one embodiment obtained from mammalian milk, such as cow milk, goat milk, horse milk and/or sheep milk.

Further embodiments are wherein said egg phospholipids include phosphatidyl choline, lysophosphatidyl choline and sphingomyelin. The egg phospholipids are in one embodiment obtained from bird eggs, such as chicken egg, duck egg, goose egg, and/or ostrich egg.

Further embodiments are wherein said vegetable phospholipids include phosphatidyl choline, lysophosphatidyl choline. The vegetable phospholipids are in one embodiment obtained from soy, rapeseed and/or sunflower.

Further embodiments are wherein said nutritional composition further comprises protein in an amount of 1.4 to 2.5 g/100 Kcal. The protein is selected from the group consisting of milk proteins, animal proteins, vegetable proteins, free amino acids and/or a combination thereof. The milk protein may in one embodiment be casein or whey protein. The protein may be fully or partially hydrolyzed.

Further embodiments are wherein said nutritional composition further comprises a mineral selected from the group consisting of iron, zinc, calcium, phosphorus, copper, magnesium and combinations thereof.

Further embodiments are wherein said nutritional composition further comprises a fatty acid derivative comprising docosahexaenoic acid, arachidonic acid, nervonic acid, stearic acid and combinations thereof. In one embodiment the docosahexaenoic acid and arachidonic acid is phospholipid bound.

Further embodiments are wherein the nutritional composition further comprises bioactive compounds, such as immunoglobulin, lactoferrin, gangliosides, sialic acid, vitamins selected from vitamin B12, folic acid and/or combinations thereof.

Further embodiments of the compositions are free or essentially free from choline salts.

Further aspects of the invention are the use of the nutritional composition as an infant formula, as a nutritional support for pregnant women and/or as a senior nutritional supplement.

Further aspects of the invention are a method of producing the nutritional composition by mixing egg and milk phospholipids, and optionally vegetable phospholipids thereby obtaining the nutritional composition comprising at least 6 mg choline/100 kJ.

FIGURES

FIG. 1 Mean changes in plasma choline concentrations after egg yolk phospholipid and choline bitartrate consumption. iAUC: incremental area under the curve.

Figure 2:
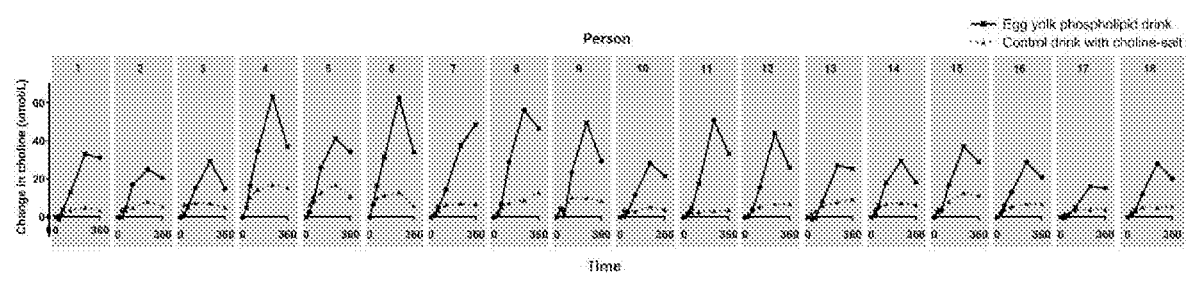

FIG. 2 Individual choline responses after egg yolk phospholipid or choline bitartrate consumption.

Figure 3:
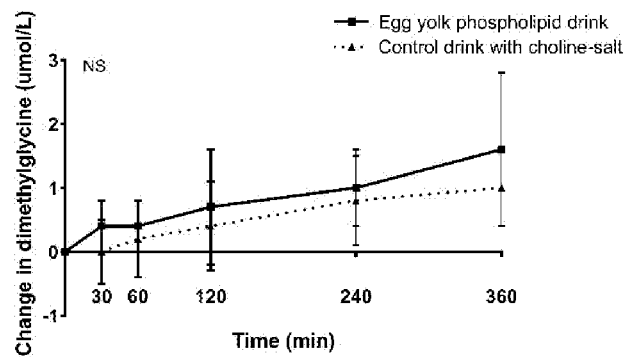
Figure 3:
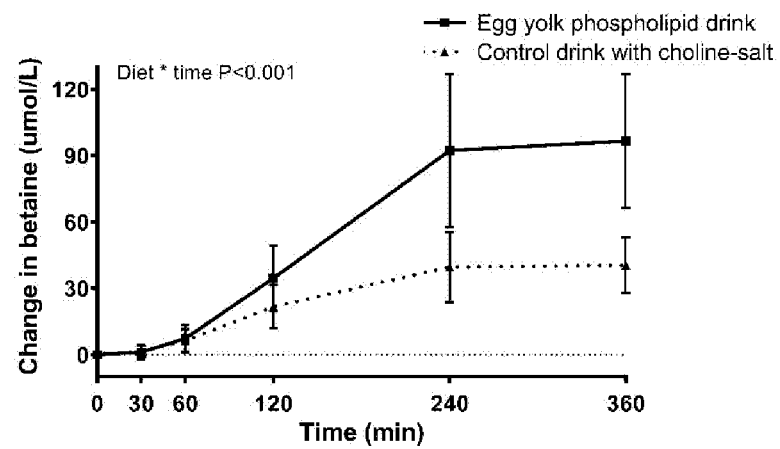

FIG. 3 Mean changes in plasma A) betaine and B) dimethylglycine concentrations after egg yolk phospholipid and choline bitartrate consumption.

DETAILED DESCRIPTION

For a more complete understanding of the present invention and the advantages thereof, reference is made to the following description and examples of the invention.

It should be appreciated that various embodiments of the present invention can be combined with other embodiments of the invention and are merely illustrative of the specific ways to make and use the invention and do not limit the scope of the invention when taken into consideration with the claims and the following detailed description.

Definitions

The term "vegetable phospholipid" is intended to mean a phospholipid originating from a plant. Thus, a vegetable phospholipid is still to be understood as vegetable phospholipid after extraction and/or purification from the natural source.

The term "milk phospholipid" is intended to mean a phospholipid originating from a milk source from a mammal. Thus, a milk phospholipid is still to be understood as milk phospholipid after extraction and/or purification from the natural source.

The term "egg phospholipid" is intended to mean a phospholipid originating from an egg from a bird. Thus, an egg phospholipid is still to be understood as egg phospholipid after extraction and/or purification from the natural source.

The term "infant" is intended to follow the definition from the EU on infant formulas wherein the term "infant" means children under the age of 12 months.

The term "infant formula" is intended to mean foodstuffs and food compositions intended for particular nutritional use by infants during the first four to six months of life and satisfying on their own the nutritional requirements of this infant category of humans. It is understood that infants can be fed solely with infant formulas, or that the infant formula can be used as a supplement to human breast milk.

The term "pregnant woman" is intended to mean a human female carrying a developing embryo or fetus within the female body. This condition can be indicated by positive results on an over-the-counter urine test, and confirmed through a blood test, ultrasound, detection of fetal heartbeat, or an X-ray. Pregnancy lasts for about nine months, measured from the date of the woman's last menstrual period.

The term "senior" is intended to mean a human being older than 60 years of age. The term is intended to encompass both healthy seniors and seniors suffering of one or more age-related nutritional linked conditions. The term may be used interchangeable with the term "elderly people", "elderly human" or "elderly population".

As used herein, "%" or "percentage" relates to weight percentage i.e. wt. % or wt.-% if nothing else is indicated.

As used herein the term "dry matter" is intended to mean a dehydrated version of the final product, which upon rehydration in e.g. water will result in a nutritional composition suitable for administration to the intended recipient, i.e. the infant, the pregnant woman or the elderly person.

The term "comprising" or "to comprise" is to be interpreted as specifying the presence of the stated parts, steps, features, or components, but does not exclude the presence of one of more additional parts, steps, features, or components.

As used herein, the term "and/or" is intended to mean the combined ("and") and the exclusive ("or") use, i.e. "A and/or B" is intended to mean "A alone, or B alone, or A and B together".

As used herein, the singular forms "a", "an" and "the" include plural referents unless the context clearly dictates otherwise.

As used herein, the term "fatty acid" encompasses free fatty acids and fatty acyl residues in triglycerides or phospholipids depending on the context.

As used herein, the term "triglycerides" may be used interchangeably with the term "triacylglycerides" and should be understood as an ester derived from glycerol and three fatty acids. "Triglycerides" may be abbreviated TG or TAG.

The Composition According to the Invention

One aspect of the present invention relates to a nutritional composition comprising milk phospholipids and egg phospholipids and optionally vegetable phospholipids, and wherein the nutritional composition contains at least 6 mg choline/100 kJ.

This nutritional composition of the present invention fulfills the requirement for an infant formula in relation to the level of choline present as defined by the European Food Safety Authority (EFSA). Thus, it comprises at least 6 mg choline/100 kJ, such as at least 7 mg choline/100 kJ, such as at least 8 mg choline/100 kJ, such as at least 9 mg choline/100 kJ, such as at least 10 mg choline/100 kJ, such as at least 11 mg choline/100 kJ, such as at least 12 mg choline/100 kJ.

In another embodiment the nutritional composition of the present invention comprises from 6 mg choline/100 kJ to 12 mg choline/100 kJ, such as from 6 mg choline/100 kJ to 10 mg choline/100 kJ, such as from 6 mg choline/100 kJ to 8 mg choline/100 kJ.

In another embodiment the nutritional composition of the present invention comprises from 8 mg choline/100 kJ to 12 mg choline/100 kJ, such as from 10 mg choline/100 kJ to 12 mg choline/100 kJ, such as from 11 mg choline/100 kJ to 12 mg choline/100 kJ.

One of the key compounds in the human breast milk is the natural form of choline, which is essential for cell and brain development in the infant, and is supplied through the human breast milk predominantly via phospholipids as also described herein below in the section "phospholipids". Thus, supplying the infants with additional choline would be an advantage.

Choline consumption in pregnant women is important for the cognitive development and neural tube development of the infant. The fetus uses all stored and consumed choline of the mother during pregnancy, because of its high choline needs. Thus, supplying the pregnant women with additional choline would be an advantage.

For seniors/elderly people, choline consumption contributes to maintain a normal liver function, homocysteine metabolism and lipid metabolism. Choline deficiency can lead to diseases such as liver disease, atherosclerosis and neurological disorders. Thus, supplying the seniors with additional choline would be an advantage.

To reach the same levels of choline in infant nutritional compositions as in human breast milk, choline salts are usually added to the nutritional composition. Choline salts however, do not have a good bio-availability, giving a need for a more readily available source of choline. The present invention solves this problem by administering milk and egg phospholipids together to provide a nutritional composition which fulfills the nutritional requirements of infant nutrition combined with high bioavailability of the choline (see the examples section).

The milk and egg phospholipids present in the nutritional composition of the present invention provides a surprisingly high level of phosphatidylcholine and sphingomyelin with levels well within the requirements made to infant nutrition supplements, while at the same time keeping the high bioavailability needed. This is described in the Examples of the present patent application. The present invention provides a nutritional composition especially well suited as an infant nutritional composition, but also as a nutritional support product for pregnant women and as senior nutritional supplement, where choline and thus phosphatidylcholine and sphingomyelin also are highly relevant (see the Examples section).

The nutritional composition of the present invention may take different forms before being delivered to the receiving population (described herein below in the section "receiving population"). In one embodiment the composition is provided in a dry form, i.e. as a powder intended for rehydration by the receiving population. In another embodiment the composition is provided in a liquid form which is either ready for consumption or can be further diluted before consumption by the receiving population. In another embodiment the nutritional composition is provided in solid form at e.g. a food bar intended to be consumed by the receiving population.

Phospholipids

There are different classes of phospholipids (PL), namely phosphatidylcholine (PC), lysophosphatidylcholine (LPC), phosphatidylethanolamine (PE), sphingomyelin (SM), phosphatidylserine (PS) and phosphatidylinositol (PI). These different classes of PL can be found in different dietary sources in different quantities.

For the nutritional composition of the present invention especially SM, PC and LPC is of high relevance.

Sphingomyelin (SM) is a type of sphingolipid found in animal cell membranes, especially in the membranous myelin sheath that surrounds some nerve cell axons. This myelination process is important in the development of the human brain. The main source of sphingomyelin are dairy products, however also a small amount can be found in egg.

Sphingomyelin consists of a phosphocholine head group, a sphingosine, and a fatty acid. It is one of the few membrane phospholipids not synthesized from glycerol. The sphingosine and fatty acid can collectively be categorized as a ceramide. This composition allows sphingomyelin to play significant roles in signaling pathways: the degradation and synthesis of sphingomyelin produce important second messengers for signal transduction.

Sphingomyelin and sphingolipid metabolites are thus fundamental components of the central nervous system.

Sphingomyelin and phosphatidylcholine make up most of the phospholipids from human breast milk contributing with 29-42% and 19-38% of the total phospholipid content respectively. The available infant formulas on the market today contain lower sphingomyelin concentrations than human breast milk which could affect infant growth and brain development. SM can be produced in the human body by conversion of PC making it possible to compensate for a given lower amount of SM if only the level of PC is sufficiently high in the nutritional composition. However, in contrast, SM cannot be converted to PC by the body.

The digestion and absorption of SM generate the bioactive metabolites ceramide and sphingosine-1-phosphate while also generating the important choline in this process. Thus, in infant nutrition SM is needed to mimic human breast milk and is important for the neuron development of the infant and is a source of choline.

Phosphatidylcholines (PC) are a class of phospholipids that incorporate choline as a headgroup. They are a major component of biological membranes and can be easily obtained from a variety of readily available sources, such as meat, eggs or soybeans, from which they are mechanically or chemically extracted using hexane or other extracted by means of other suitable solvent systems for example comprising ethanol and water.

Phosphatidylcholines are such a major component of lecithin that in some contexts the terms are sometimes used as synonyms. However, lecithin extracts consist of a mixture of phosphatidylcholine and other compounds. In the present invention, lecithin and phosphatidylcholine may be used interchangeably.

The choline molecule has several functions in the human body including acting like a precursor for the neurotransmitter acetylcholine, which is one of the most important neurotransmitters of the parasympathetic nervous system. Choline is also a source of methyl groups which is essential for optimal development of the brain. Choline is thus very important for the brain development and growth of the human fetus. Infants does not produce choline themselves and are thus dependent on getting the important molecule through their diet. Choline naturally occurs in human breast milk, mostly in the form of phosphocholine, glycerophosphocholine and phosphatidylcholine. It is evident that choline should be added to infant nutritional compositions and the solutions presently on the market add choline in the form of a choline salt (mostly choline bitartrate or choline chloride). The bioavailability of choline salt is lower than the bioavailability of natural choline as also demonstrated in the examples section of this application (see example 5).

Lysophosphatidylcholines (LPC, lysoPC), are also called lysolecithins and hydrolyzed lecithin or enzyme-modified lecithin. LPC are a class of chemical compounds which are derived from phosphatidylcholine. They result from partial hydrolysis of phosphatidylcholines, which removes one of the fatty acid groups.

LPCs occur in many foods naturally, namely the same sources as phosphatidylcholine.

LPC as such does not have specific health benefits. However, when DHA is bound to LPC it can easily cross the blood brain barrier while DHA bound to a TAG cannot. This is an advantage especially when it comes to nutritional compositions. When dietary DHA is provided in the sn-1 position of PC or in the form of LPC in the diet, it should escape the hydrolysis by pancreatic $PLA_2$, and will be absorbed as PC-DHA, which can be transported over the brain.

MFGM is a structurally complex bioactive milk component, found in human milk as well as the milk of other mammalian species. The MFGM in human milk contains many bioactive components with diverse functions and has been linked to cognitive and health benefits to infants. Some compositional differences are reported to exist between species, but bovine MFGM, the best-studied non-human source, generally contains a lipid and protein composition, which is similar to that of human MFGM. The milk phospholipids of the present invention can in one embodiment be obtained from MFGM.

The lipid component of MFGM is rich in phospholipids, glycosphingolipids, and cholesterol. Phospholipids make up approximately 30% of the total lipid weight of MFGM, the three most prominent being sphingomyelin (SM), phosphatidylcholine (PC), and phosphatidylethanolamine (PE), which together represent up to 85% of total phospholipids of MFGM. Phospholipids and sphingolipids play central roles in cerebral neurogenesis and migration during fetal development, as well as promoting neuronal growth, differentiation, and synaptogenesis during the first year of life as also discussed herein above.

Preclinical studies have demonstrated effects of MFGM-derived bioactive components on brain structure and function, intestinal development, and immune defense. Similarly, pediatric clinical trials have reported beneficial effects on cognitive and immune outcomes. In populations ranging from premature infants to preschool-age children, dietary supplementation with MFGM or its components has been associated with improvements in cognition and behavior, gut and oral bacterial composition, fever incidence, and infectious outcomes including diarrhea and otitis media.

MFGM may also play a role in supporting cardiovascular health by modulating cholesterol and fat uptake making MFGM a possible important component of a nutritional composition directed at the elderly population (i.e. senior nutrition).

The present invention provides a nutritional composition which comprises a combination of milk and egg phospholipids which in one embodiment also is combined with vegetable phospholipids.

In one embodiment the milk phospholipids of the present invention include phosphatidylcholine, lysophosphatidylcholine and sphingomyelin. In a preferred embodiment, the milk phospholipids are phosphatidylcholine and sphingomyelin.

The milk phospholipids of the present invention are obtained from mammalian milk, such as bovine milk, goat milk, horse milk and/or sheep milk. In a preferred embodiment the milk phospholipids are obtained from cow milk.

In one embodiment the egg phospholipids of the present invention include phosphatidylcholine, lysophosphatidylcholine and sphingomyelin. In a preferred embodiment, the egg phospholipids are phosphatidylcholine and sphingomyelin.

The egg phospholipids of the present invention are obtained from bird eggs, such as chicken egg, duck egg, goose egg, and/or ostrich egg. In a preferred embodiment the egg phospholipids are obtained from chicken egg.

In one embodiment the vegetable phospholipids of the present invention include phosphatidylcholine and lysophosphatidylcholine.

The vegetable phospholipids of the present invention are obtained from soy, rapeseed and/or sunflower. In a preferred embodiment the vegetable phospholipids are obtained from soy.

The different phospholipids present in the nutritional composition of the invention may in one embodiment contribute with different amounts of choline. This depends on the natural amount of choline present in the different sources of phospholipids. Because the egg, milk and vegetable phospholipids contain different natural amounts of choline, mixing the phospholipids from different source provide the advantages as described in connection with the present invention.

The most accurate way of describing the amount of choline is per dry matter of the resulting nutritional composition. By "dry matter" is intended to mean a dehydrated powder version of the final product, which upon rehydration in e.g. water will result in a nutritional composition suitable for administration to the intended recipient, i.e. the infant, the pregnant woman or the elderly person.

In one embodiment of the present invention, between 4.5 and 230 mg of choline per 100 g of dry matter is supplied via egg phospholipids. In another embodiment between 4.5 and 200 mg of choline per 100 g of dry matter is supplied via egg phospholipids, such as between 4.5 and 150 mg, such as between 4.5 and 100 mg, such as between 4.5 and 50 mg, such as between 4.5 and 25 mg.

In another embodiment between 25 and 230 mg of choline per 100 g of dry matter is supplied via egg phospholipids, such as between 50 and 230 mg, such as between 100 and 230 mg, such as between 150 and 230 mg, such as between 200 and 230 mg.

In one embodiment of the present invention, between 14 and 122 mg of choline per 1 g of dry matter is supplied via milk phospholipids. In another embodiment between 14 and 120 mg of choline per 1 g of dry matter is supplied via milk phospholipids, such as between 14 and 100 mg, such as between 14 and 80 mg, such as between 14 and 60 mg, such as between 14 and 40 mg, such as between 14 and 30 mg.

In another embodiment between 20 and 122 mg of choline per 1 g of dry matter is supplied via milk phospholipids, such as between 30 and 122 mg, such as between 50 and 122 mg, such as between 70 and 122 mg, such as between 90 and 122 mg, such as between 100 and 122 mg.

In one embodiment of the present invention, between 0 and 50 mg of choline per 1 g of dry matter is supplied via vegetable phospholipids. In another embodiment between 0 and 40 mg of choline per 1 g of dry matter is supplied via vegetable phospholipids, such as between 0 and 30 mg, such as between 0 and 20 mg, such as between 0 and 10 mg.

Other Ingredients

Proteins are important components of human nutrition at all ages. Thus, in one embodiment the nutritional composition of the present invention further comprises protein. The amount of protein needed depends on the intended recipient of the nutritional composition and the skilled person will know how to make the dosages of protein correct. In one embodiment the nutritional composition is intended for infant nutrition and in that embodiment, protein is present in an amount of 1.4 to 2.5 g/100 Kcal.

In another embodiment the nutritional composition of the present invention is intended for pregnant women and in that embodiment the protein present in the nutritional composition of the invention can be considered to be an additional intake of protein besides the normal diet of the pregnant women, such as in an amount of 1 to 28 g protein/daily dosage of the nutritional composition of the present invention.

In another embodiment the nutritional composition of the present invention is intended for seniors/elderly people and in that embodiment the protein can advantageously be calculated in relation to the body weight of the recipient. In that embodiment the amount of protein should be in the range of 80 to 90 g/kg bodyweight per daily dosage.

Protein can be obtained from many different sources and in one embodiment of the present invention the protein is selected from the group consisting of milk proteins, animal proteins, vegetable proteins, free amino acids or a combination thereof.

The milk protein is preferably casein or whey protein.

In one embodiment of the present invention the protein comprises fully or partially hydrolyzed protein.

Other possibly important components present in a nutritional composition is minerals which support the development and/or maintenance of the recipient. Thus, in one embodiment the nutritional composition further comprises a mineral selected from the group consisting of iron, zinc, calcium, phosphorus, copper, magnesium and combinations thereof.

Some free fatty acids have been proven to be beneficial in nutritional compositions such as docosahexaenoic acid, arachidonic acid, nervoinic acid, and stearic acid. Thus, in one embodiment of the present invention the nutritional composition further comprises a fatty acid derivative comprising docosahexaenoic acid, arachidonic acid, nervoinic acid, stearic acid and combinations thereof.

In one embodiment the docosahexaenoic acid and arachidonic acid is bound to phospholipids. This has been shown to increase the stability of the docosahexaenoic acid and arachidonic acid making them more suitable for nutritional compositions which are intended to be stored for a longer period of time.

The skilled person will know that further bioactive compounds can be added to the nutritional composition, such as immunoglobulin, lactoferrin, gangliosides, sialic acid, vitamins selected from vitamin B12, folic acid and combinations thereof.

Receiving Population

The nutritional requirements of humans differ all through life, and especially during pregnancy, infancy and elderly people have increased nutritional needs. One nutrient that remains important is choline, which are particularly important for infants, pregnant women and elderly people, but also for the normal healthy adult who rarely obtain enough choline through the normal diet.

One of the key compounds in the human breast milk is the natural form of choline. Choline is essential for cell and brain development in the infant. Phosphatidylcholine (PC) is a major part of all cell membranes and is especially high in all cell membranes in the brain. Infants grow very fast and therefore have a high need for choline in order to develop well. Infants cannot produce choline themselves, therefore choline needs to be supplied via the diet. Additionally, both PC and LPC (lysophosphatidylcholine) are important for the transport of DHA to the brain of the infant. DHA cannot be synthesized in the brain and can only enter the brain when it is bound to an LPC. By supplying DHA together with natural choline the effect of DHA on cognition is improved. Choline is thus essential for infant's development. For that reason, in the U.S. and EU, infant formula must contain choline. To meet these recommendations, infant formulas derived from non-animal sources need added choline, since the raw materials contain no, or not enough, choline. Thus, supplying the infants with additional choline would be an advantage.

Especially during pregnancy and lactation choline consumption is very important. During these periods the demand for choline is high; plasma choline concentrations in pregnant women have shown to be 45% higher than in non-pregnant women, new-born infants have three times higher plasma choline concentrations than their mothers, and large amounts of choline are present in human milk. The choline supply of the pregnant women has been shown to be affected by the woman's diet, but most pregnant women have a choline intake which is far below the adequate intakes. Therefore, additional supplementation is needed. Indeed, maternal choline supplementation during pregnancy has been shown to improve infant's cognitive function, as well as neural tube development. Thus, supplying the pregnant women with additional choline would be an advantage.

For seniors/elderly persons, choline consumption affects disease development. First of all choline can affect cardiovascular disease (CVD) risk. Betaine, choline's main metabolite, act as a methyl donor in the remethylation of homocysteine in the liver and can via this reduce homocysteine levels. High homocysteine concentrations are associated with higher risk for developing CVD. Additionally, natural choline can lower cholesterol absorption and affect the production of lipoproteins in the liver. Via both actions' choline contributes to maintain a normal lipid metabolism and reduces CVD risk. Choline also contributes to a normal liver function. The liver is the major site of choline metabolism. Choline deficiency is associated with liver damage and the development of a fatty liver. These effects can be reversed by dietary choline consumption. Finally, choline can slow down neurological decline. PC can serve as a phospholipid precursor for the brain. It supports the structural integrity of neurons and promotes cognitive function in elderly adults. Thus, supplying the seniors with additional choline would be an advantage.

The invention is further described in the following non-limiting items:

Item 1: A nutritional composition comprising milk phospholipids and egg phospholipids and optionally vegetable phospholipids, and wherein the nutritional composition contains at least 6 mg choline/100 kJ.

Item 2: A nutritional composition comprising milk phospholipids and egg phospholipids and optionally vegetable phospholipids, wherein the nutritional composition contains at least 7 mg choline/100 kJ, such as at least 8 mg choline/100 kJ, such as at least 9 mg choline/100 kJ, such as at least 10 mg choline/100 kJ, such as at least 11 mg choline/100 kJ, such as at least 12 mg choline/100 kJ.

Item 3: A nutritional composition comprising milk phospholipids and egg phospholipids and optionally vegetable phospholipids, and wherein the nutritional composition contains at least 6 mg choline/100 kJ, wherein the choline is phospholipid bound choline.

Item 4: A nutritional composition in accordance with Item 1-3, wherein said milk phospholipids include phosphatidylcholine, lysophosphatidylcholine and sphingomyelin.

Item 5: A nutritional composition in accordance with Item 4, wherein said milk phospholipids are obtained from mammalian milk, such as bovine milk, goat milk, horse milk and/or sheep milk.

Item 6: A nutritional composition in accordance with Item 5, wherein said egg phospholipids include phosphatidylcholine, lysophosphatidylcholine and sphingomyelin.

Item 7: A nutritional composition in accordance with Item 6, wherein said egg phospholipids are obtained from bird eggs, such as chicken egg, duck egg, goose egg, and/or ostrich egg.

Item 8: A nutritional composition in accordance with Items 1-7, wherein said vegetable phospholipids include phosphatidylcholine and lysophosphatidylcholine.

Item 9: A nutritional in accordance with Item 8, wherein said vegetable phospholipids are obtained from soy, rapeseed and/or sunflower.

Item 10: A nutritional composition in accordance with Item 1-9, wherein between 4.5 and 230 mg of choline per 100 g of dry matter is supplied via egg phospholipids.

Item 11: A nutritional composition in accordance with Item 1-10, wherein between 14 and 122 mg of choline per 1 g of dry matter is supplied via milk phospholipids.

Item 12: A nutritional in accordance with Item 1-11, wherein between 0 and 50 mg of choline per 1 g of dry matter is supplied via vegetable phospholipids.

Item 13: A nutritional composition in accordance with Item 1-12, wherein said nutritional composition further comprises protein in an amount of 1.4 to 2.5 g/100 Kcal.

Item 14: A nutritional composition in accordance with Item 13, wherein the protein is selected from the group consisting of milk proteins, animal proteins, vegetable proteins, free amino acids or a combination thereof.

Item 15: A nutritional composition in accordance with Item 14, wherein the milk protein is casein or whey protein.

Item 16: A nutritional composition in accordance with Items 13-15, wherein the protein comprises fully or partially hydrolyzed protein.

Item 17: A nutritional composition in accordance with Items 1-16, wherein said nutritional composition further comprises a mineral selected from the group consisting of iron, zinc, calcium, phosphorus, copper, magnesium and combinations thereof.

Item 18: A nutritional composition in accordance with Items 1-17, wherein the nutritional composition further comprises a fatty acid derivative comprising docosahexaenoic acid, arachidonic acid, nervoinic acid, stearic acid and combinations thereof.

Item 19: A nutritional composition in accordance with Items 1-18, wherein the nutritional composition comprises phospholipid bound docosahexaenoic acid and phospholipid bound arachidonic acid.

Item 20: A nutritional composition in accordance with Items 1-19, wherein the nutritional composition further comprises bioactive compounds, such as immunoglobulin, lactoferrin, gangliosides, sialic acid, vitamins selected from vitamin B12, folic acid and combinations thereof.

Item 21: A nutritional composition in accordance with Items 1-20 free or essentially free from choline salts.

Item 22: The use of the nutritional composition in accordance with Items 1-21 as an infant formula, as a nutritional support for pregnant women and/or as a senior nutritional supplement.

Item 23: A method of producing the nutritional in accordance with Items 1-21 comprising:

a) mixing egg phospholipids and milk phospholipids, and optionally vegetable phospholipids;

b) optionally adding proteins, minerals, fatty acid derivatives, bioactive compounds and/or other nutrients; thereby obtaining said nutritional composition, which can additionally be subjected to one or more of the following steps:

c) emulsifying said nutritional composition;

d) packaging said nutritional composition as a liquid drink; or e) drying said nutritional composition to obtain a powder.

Item 24: A method in accordance with Item 23, wherein the powder is obtained by spray drying or freeze drying.

EXAMPLES

Example 1 Infant Formula 0-6 Months

A commercially available infant formula for feeding the infant the first 6 month of life (term-born infant) contains 2029 kcal/100 g powder, 9.6 g protein/100 g powder of which 50 wt % is casein and 50 wt % is whey protein and 25 g of fat/100 g powder.

The target choline content of the infant formula is 125 mg/100 g powder, corresponding to 6.2 mg choline/100 kJ. Choline is added in natural form, bound to phospholipids, in order to have a better bio-availability of choline than achieved with the addition choline salts. See also example 5 of the present application for data on bio-availability of choline.

In this infant formula the sources of natural choline are skim milk, whey protein concentrate enriched with milk fat globular membrane, soy lecithin and egg phospholipids. The composition of the different sources are summarized in Table 1.

TABLE 1

|  | Skim milk powder | Whey protein concentrate, high in milk fat globular membrane (WPC with MFGM) | Soy Lecithin | Oil containing egg phospholipids (ELIP3020) |
|---|---|---|---|---|
| Total Protein (g/100 g) | 37.5 | 51 | 0 | 0 |
| Casein (g/100 g) | 30.0 | 0 | 0 | 0 |
| Whey protein (g/100 g) | 7.5 | 51 | 0 | 0 |
| Fat (g/100 g) | 1.0 | 29 | 100 | 100 |
| Phospholipids (g/100 g) | 0.6 | 16 | 47 | 34 |
| (lyso) Phosphatidylcholine | 0.1 | 4.3 | 15 | 28 |
| Sphingomyelin | 0.1 | 4.3 | 0 | 1 |
| Natural choline (g/100 g) | 0.04 | 1.2 | 2.0 | 3.9 |

A recipe for an infant formula according to the invention is mixed using the above ingredients according to the recipe described herein below in table 2. The recipe is designed so that the legal requirements to the content of infant formulas is fulfilled.

Recipe of Infant Formula with Natural Choline from Egg Phospholipids

TABLE 2

| recipe of infant formula according to the invention | |
| --- | --- |
| Lactose | 50.2 g/100 g |
| AKONINO-Vegetable oil blend | 22.0 g/100 g |
| Skim milk dry matter | 15.9 g/100 g |
| WPC with MFGM | 7.0 g/100 g |
| AKONINO ELIP3020-Egg phospholipids | 0.8 g/100 g |
| Soy lecithin | 0.13 g/100 g |
| Choline salts | 0 g/100 g |
| In addition, powdered infant formula contains added vitamins, minerals and other micro-nutrients in mg/100 g or lower levels | |

In the table below the macronutrient composition of the formula containing choline from egg phospholipids (table 2) and a commercially available formula with added choline salts are shown. It can be seen that the macronutrient composition of both formulas is the same. In both formula choline bound to phospholipids is present. However, the commercial formula also contains choline in the form of choline salts, which is less bioavailable (see also example 5 of the present invention). In contrast the formula of the invention contain all the choline as choline bound to phospholipids. This is because besides having added milk phospholipids (which is present in both formulas providing some choline bound to phospholipids) the formula according to the invention also have added egg phospholipids, which provides choline bound to phospholipids originating from egg.

Macronutrient Composition Breakdown

TABLE 3

| | Commercial formula for Infant Formula 0-6 months-EU (reference) | Formula with Natural choline from Egg phospholipids |
| --- | --- | --- |
| Fat (g/100 g powder) | 25.0 | 25.0 |
| Carbohydrates (g/100 g powder) | 53.7 | 53.7 |
| Protein (g/100 g) | 9.6 | 9.6 |
| Casein (g/100 g) | 4.8 | 4.8 |
| Whey protein (g/100 g) | 4.8 | 4.8 |
| Choline (mg/100 g) | 125 | 125 |
| natural PL-bound choline | 93 | 125 |
| choline as added salt | 32 | 0 |

Example 2 Preterm Infants

Preterm infants require per g of kg of body weight more choline than term infants to facilitate growth, brain & nerve development. Therefore, for formulas aimed at preterm infants, a high level of choline is essential. Optimally as much choline as possible is added in a natural form as phospholipids and use of choline salts should be limited.

A formula aimed at preterm infants typically contains, 2058 kJ/100 g; 26 g of fat/100 g, including 0.2 g of DHA; 13.5 g of protein/100 g with a casein:whey ration of 40:60 and 205 mg choline/100 g corresponding with 10 mg/100 kJ of formula.

In this preterm infants test formula the source of choline is egg phospholipids because it naturally contains a the high level of choline per gram of phospholipids (11.4 g/100 g phospholipids), which is higher than in milk phospholipids (7.5 g/100 g phospholipids) and soy phospholipids (4.3 g/100 g phospholipids). Skim milk is used as source of casein and whey, and a whey protein concentrate as source of whey proteins. No vegetable based lecithin is added, since the egg phospholipids can also act as anti-oxidant and emulsifier.

TABLE 4

| | Skim milk powder | Whey protein concentrate 80 | Oil containing egg phospholipids |
| --- | --- | --- | --- |
| Total Protein (g/100 g) | 37.5 | 80 | 0 |
| Casein (g/100 g) | 30.0 | 0 | 0 |
| Whey protein (g/100 g) | 7.5 | 80 | 0 |
| Fat (g/100 g) | 1.0 | 6.6 | 100 |
| DHA (g/100 g) | 0 | 0 | 0.8 |
| Phospholipids (g/100 g) | 0.6 | 2.2 | 34 |
| (lyso) Phosphatidylcholine | 0.1 | 0.6 | 28 |
| Sphingomyelin | 0.1 | 0.6 | 1 |
| Natural choline (g/100 g) | 0.04 | 0.2 | 3.9 |

A test recipe of a preterm infant formula is mixed using the above ingredients according to the recipe described herein below in table 5. The recipe is designed so that the legal requirements to the content of preterm infant formulas is fulfilled.

Recipe of Preterm Infant Formula with Natural Choline from Egg Phospholipids

TABLE 5

| Lactose | 43.5 g/100 g |
| --- | --- |
| AKONINO-oil blend | 21.6 g/100 g |
| Skim milk dry matter | 17.7 g/100 g |
| WPC80 | 8.5 g/100 g |
| AKONINO ELIP3020-Egg phospholipids | 4.7 g/100 g |
| Choline as added salt | 0 g/100 g |
| In addition, powdered infant formula contains added vitamins, minerals and other micro-nutrients in mg/100 g or lower levels | |

The above recipe (table 5) will give a preterm infant formula containing 22 mg of choline which come from milk phospholipids and about 183 mg originates for egg phospholipids.

Macronutrient Composition Breakdown

TABLE 6

| | Commercial formula for pre term infants (reference) | Formula with Natural choline from Egg phospholipids |
| --- | --- | --- |
| Fat (g/100 g powder) | 26.0 | 26.0 |
| DHA (g/100 g) | 0.2 | 0.2 |
| Carbohydrates (g/100 g powder) | 49.3 | 49.3 |
| Protein (g/100 g) | 13.5 | 13.5 |
| Casein (g/100 g) | 5.3 | 5.3 |
| Whey protein (g/100 g) | 8.1 | 8.1 |
| Choline (mg/100 g) | 205 | 205 |
| natural PL-bound choline | 22 | 205 |
| choline as added salt | 183 | 0 |

One important additional advantage of this recipe is that, because of the egg phospholipids, approximately 17% of the DHA is supplied via egg phospholipids, so called phospholipid bound DHA which has a higher bio-availability than triglyceride bound DHA. This mimics human breast milk where between 10 and 20% of the DHA is phospholipids-bound. DHA is essential for brain development.

Example 3 Milk Chocolate Bar for Pregnant Woman

If a food product in Europe supply more than 82.5 mg choline per day, it is possible to put the following health claims on the package of the food product:
- Choline contributes to normal homocysteine metabolism in the general population.
- Choline contributes to normal lipid metabolism in the general population.
- Choline. contributes to the maintenance of normal liver function in the general population.

In chocolate bars normally soy lecithin is used for emulsification. However, the soy lecithin could be replaced with egg lecithin. In this way the choline level of a milk chocolate bar can easily be boosted without losing the emulsifying effect.

Full cream milk powder containing 110 mg of choline per 100 g is used to produce a chocolate bar of 125 g with 15% total milk solids. The soy lecithin is replaced with 0.5% egg phospholipids. The egg phospholipids used in this recipe contain 11.4 g choline per 100 g of phospholipids. This results in a milk chocolate bar containing in total 92 mg of choline, coming from milk (21 mg) and egg (71 mg) and without having to add any choline salts.

Example 4 Drink for Seniors/Elderly People

The adequate intake of choline in seniors is 550 mg/day for men and 425 mg/day for women. Since choline intake in most seniors is far below this nutritional advice, a drink is made to boost choline concentrations in these seniors. The drink contains 37 g freeze-dried egg phospholipids (equivalent to 3 g choline). The ingredients of this drink can be found in Table and the macronutritional composition values in Table 8.

TABLE 7

Ingredients in the drink to boost choline for seniors

| Ingredient | Amount |
| --- | --- |
| ELIP 75 (AAK) (g)-Egg phospholipids | 37 |
| High oleic sunflower oil (AAK) (ml) | 4.0 |
| Mango juice (ml) | 230 |
| Whey protein isolate (g) | 20 |
| Maltodextrin (g) | 40 |

TABLE 8

Macronutrient composition of the drinks drink to boost choline concentrations for seniors

| | Egg yolk phospholipid drink |
| --- | --- |
| Energy (kcal) | 712 |
| Fat (g) | 41 |
| Carbohydrates (g) | 67 |
| Protein (g) | 19 |
| Choline (g) | 3.0 |
| DHA (mg) | 595 |

DHA; docosahexaenoic acids

Example 5 Bio-Availability of Choline

To examine the bioavailability of choline a randomized, double blind, cross-over trial was performed. 18 healthy adult participants (age: 30-70 years, BMI 18.5-24.9 kg/m$^2$) received an egg yolk phospholipid drink (test drink as described in example 4 herein above) and a control drink with choline bitartrate as the source of choline, each drink administered one week apart.

The results clearly demonstrated that choline is better absorbed when it is consumed in the natural form, i.e. bound to phospholipids, compared to administered as choline salts instead. Choline absorption was 4 times higher when egg yolk phospholipid was consumed compared with choline bitartrate intake, as determined by the incremental area under the curve (iAUC) (FIG. 1). This difference in absorption was highly significant and very consistent among participants (FIG. 2). The main metabolites of choline, betaine and dimethylglycine, showed similar outcomes. Plasma concentrations of both betaine and dimethylglycine were significantly increased after egg yolk phospholipid consumption compared with choline bitartrate intake (FIG. 3).

To conclude, the consumption of natural choline from egg yolk phospholipids improved choline absorption compared to consumption of chemically produced choline bitartrate. Apparently, the matrix in which choline is consumed is important for its uptake. This information is particularly relevant for the development of infant formula, supplements and functional foods. Instead of adding choline as a salt, adding choline from egg yolk phospholipids can improve choline uptake and thereby has a positive impact on health.

The invention claimed is:

1. A nutritional composition comprising phospholipids, wherein the nutritional composition contains at least 6 mg choline/100 kJ and between 4.5 and 230 mg of choline per 100 g of dry matter.

2. The nutritional composition of claim 1, wherein the choline is phospholipid-bound choline.

3. The nutritional composition of claim 1, wherein the phospholipids include phosphatidylcholine, lysophosphatidylcholine and sphingomyelin.

4. The nutritional composition of claim 1, wherein the nutritional composition contains between 14 and 122 mg of the choline per 1 g of dry matter.

5. The nutritional composition of claim 1, wherein the nutritional composition contains between 4.5 and 50 mg of the choline per 1 g of dry matter.

6. The nutritional composition of claim 1, wherein the nutritional composition further comprises protein in an amount of 1.4 to 2.5 g/100 Kcal.

7. The nutritional composition according to claim 6, wherein the protein is selected from the group consisting of milk protein, animal protein, vegetable protein, free amino acid and a combination thereof.

8. The nutritional composition according to claim 7, wherein the milk protein is casein or whey protein.

9. The nutritional composition according to claim 6, wherein the protein comprises fully or partially hydrolyzed protein.

10. The nutritional composition according to claim 1, wherein the nutritional composition further comprises a mineral selected from the group consisting of iron, zinc, calcium, phosphorus, copper, magnesium, and combinations thereof.

11. The nutritional composition according to claim 1, wherein the nutritional composition further comprises an esterified fatty acid chain derivative comprising docosahexaenoic acid, arachidonic acid, nervoinic acid, stearic acid, and combinations thereof.

12. The nutritional composition of claim 1, wherein the nutritional composition comprises phospholipid-bound docosahexaenoic acid and phospholipid-bound arachidonic acid.

13. The nutritional composition according to claim 1, wherein the nutritional composition is free or essentially free of choline salts.

14. The nutritional composition of claim 1, wherein the nutritional composition is used as an infant formula, as a nutritional support for pregnant women, and/or as a senior nutritional supplement.

15. A method of producing the nutritional composition of claim 1, comprising:
   a) mixing egg phospholipids, milk phospholipids, and vegetable phospholipids;
   b) adding proteins, minerals, fatty acid derivatives, bioactive compounds and/or other nutrients to the mixture to obtain a nutritional composition;
   c) emulsifying the nutritional composition; and
   d) packaging the nutritional composition as a liquid drink; or
   e) drying the nutritional composition to obtain a powder.

16. The method of claim 15, wherein the powder is obtained by spray drying or freeze drying.

\* \* \* \* \*